United States Patent [19]
Daniels et al.

[11] Patent Number: 5,120,254
[45] Date of Patent: Jun. 9, 1992

[54] WIRE SUSPENSION FOR TOY CAR

[75] Inventors: John F. Daniels, Morristown; Michael R. Hennig, West New York, both of N.J.

[73] Assignee: Matchbox Toys (USA) Ltd., Moonachie, N.J.

[21] Appl. No.: 652,041

[22] Filed: Feb. 7, 1991

[51] Int. Cl.⁵ ............................................. A63H 17/26
[52] U.S. Cl. ................................... 446/466; 446/469
[58] Field of Search ............... 446/466, 465, 431, 467, 446/468, 469, 470, 471

[56] References Cited

U.S. PATENT DOCUMENTS

| | | | |
|---|---|---|---|
| 1,853,833 | 4/1932 | Peake | 446/469 |
| 1,905,649 | 4/1933 | Peake | 446/471 |
| 1,929,257 | 10/1933 | Peake | 446/471 |
| 2,284,998 | 6/1942 | Varney | 446/447 |
| 3,593,456 | 7/1971 | Mills | 446/466 |
| 3,613,307 | 10/1971 | Baynes et al. | 446/466 |

FOREIGN PATENT DOCUMENTS

| | | | |
|---|---|---|---|
| 687502 | 5/1964 | Canada | 446/466 |
| 1244587 | 9/1960 | France | 446/466 |
| 1272043 | 8/1961 | France | 446/466 |
| 1279645 | 11/1961 | France | . |
| 121238 | 3/1948 | Sweden | . |
| 904525 | 8/1962 | United Kingdom | 446/466 |
| 989927 | 4/1965 | United Kingdom | . |
| 1194963 | 6/1970 | United Kingdom | 446/468 |

Primary Examiner—Robert A. Hafer
Assistant Examiner—D. Neal Muir
Attorney, Agent, or Firm—Amster, Rothstein & Ebenstein

[57] ABSTRACT

A wheeled toy includes a longitudinally extending chassis and at least one wheel assembly mounted in said chassis. The chassis includes cylindrical bearing wires mounted adjacent opposite sides thereof and oriented longitudinally thereof, while the wheel assembly includes a cylindrical axle transverse to the chassis and a pair of wheels at opposite ends of the axle. The bearing wires of the chassis are positioned above and perpendicular to the axle, contacting the axle at point contacts, and transmitting the weight of the chassis through the point contacts to the wheel assembly.

42 Claims, 3 Drawing Sheets

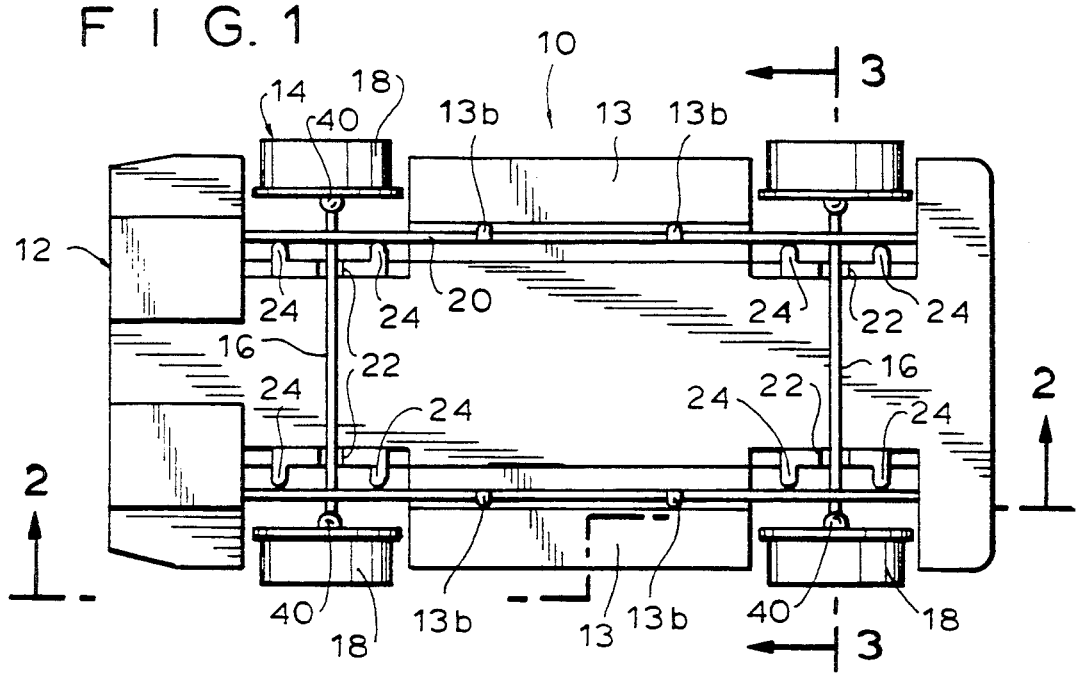
FIG. 1
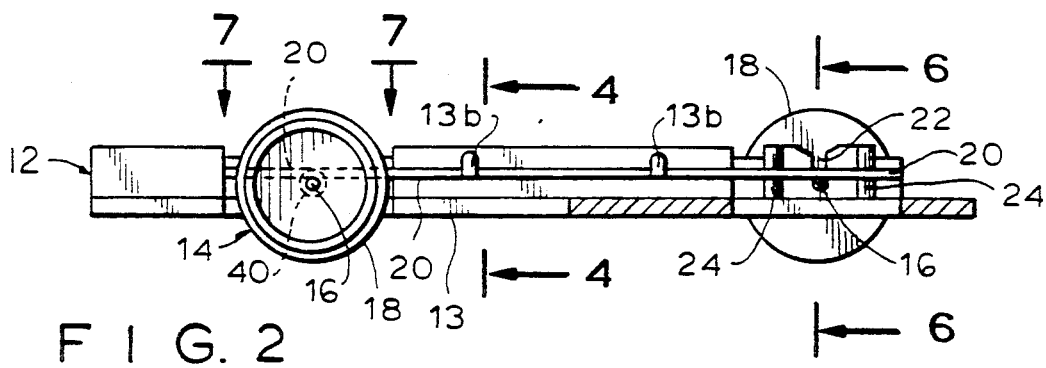
FIG. 2
FIG. 3

WIRE SUSPENSION FOR TOY CAR

BACKGROUND OF THE INVENTION

The present invention relates to wheeled toys, such as toy cars, and more particularly to the low friction mounting of a chassis on a wheel assembly thereof.

Wheeled toys, such as toy automobiles, toy railroad cars, and the like, which are unpowered rely for speed and travel distance upon the momentum initially impart thereto by the user. The frictional forces operating within the car — for example, the frictional forces between the wheels and the chassis with respect to which the wheels are rotating — reduce the speed and/or the distance which the wheeled toy can travel, all other factors being equal. Since these wheeled toys are frequently entered into competition, either for speed or for distance (without regard to speed), critical factors in the design of the toy include low weight, low wind resistance, and low internal friction between moving components of the toy.

Accordingly, it is an object of the present invention to provide a wheeled toy wherein the friction between the wheel and the chassis is minimized.

Another object is to provide such a toy wherein a wheel assembly supports the chassis vertically by only a limited number of point contacts.

A further object is to provide such a toy wherein the wheel assembly supports the chassis vertically and limits relative lateral displacement thereof by point contacts.

It is also an object of the present invention to provide such a toy wherein in one embodiment the wheel assembly supports the chassis against relative vertical, lateral and longitudinal displacement exclusively by point contacts.

SUMMARY OF THE INVENTION

It has now been found that the above and related objects of the present invention are obtained in a wheeled toy comprising a longitudinally extending chassis including cylindrical bearing wires mounted adjacent opposite sides of the chassis and oriented longitudinally thereof, the cylindrical bearing wires preferably comprising a transversely spaced pair of longitudinally extending cylindrical chassis wires. At least one wheel assembly is mounted in the chassis including a cylindrical axle (preferably in the form of a cylindrical axle wire) extending transverse to the chassis and a pair of wheels which are transversely spaced (preferably at opposite ends of the axle). The bearing wires are positioned above and perpendicular to the axle, contact the axle at point contacts, and transmit the weight of the chassis through the point contacts to the wheel assemblies. Thus the wheels vertically support the axle, the chassis wire and the chassis in turn, with the axle supporting the chassis preferably by a transversely spaced Pair of axle wire-to-chassis wire point contacts.

In a preferred embodiment, the axle is a cylindrical wire, the axle and bearing wires being substantially rigid with a hard, smooth outer surface. Each of the chassis wires defines a substantially horizontal segment and each of the axle wires defines adjacent each end thereof a substantially horizontal segment, and each of the wire-to-wire point contacts is defined by one of the substantially horizontal chassis wire segments and one of the substantially horizontal axle wire segments. Each of the chassis wires preferably defines a free end at least appreciably resiliently vertically displaceable adjacent its wire-to-wire contact point with the axle wire, thereby to function as a shock absorber. The chassis includes low friction guide means for mounting the axle to the chassis for longitudinal movement therewith, the axle being in contact only with the wheels, the bearing wires, and the guide means. The guide means preferably comprises a pair of vertically oriented bearing wires positioned to the front and rear of the axle to form at most point contacts therewith. The bearing wires of the guide means may be formed continuously with the bearing wires of the chassis.

In one variation, in each wheel assembly the wheels are fixed on the axle for rotation of the wheel assembly as a unit guided by the bearing wires of the chassis and the guide means. In another variation, in each wheel assembly the wheels are rotatably mounted on the axle to enable free rotation of the wheels relative to the axle, and the axle is rotatably mounted in the chassis to enable free rotation of the axle relative to the chassis, whereby frictional forces determine to what extent the wheels rotate with the axle wire and to what extent the wheels rotate relative to the axle wire.

Where there are a longitudinally spaced pair of the wheel assemblies mounted on the chassis, there are a total of four of the wire-to-wire point contacts for supporting the chassis on the wheel assemblies against downward vertical movement.

The wheels on a given axle wire are fixedly spaced apart transversely further than the chassis wires supported thereby, and means are provided to limit outward displacement of each of the wheels relative to the given axle wire, thereby to preclude separation of the wheels from the axle wire. The inwardly facing surface of each of the wheels on the given axle wire is configured such that the wheel can laterally abut the chassis wire with only a point contact. Preferably the inwardly facing surface of each of the wheels defines a generally inwardly pointing hub having a sloping sidewall segment configured, dimensioned and positioned to define with an adjacent chassis wire at most a point contact limiting inward movement of the wheel relative to the adjacent chassis wire, thereby precluding direct physical contact between the wheel and the remainder of the chassis. As the wheels on a given axle wire are maintained at a given transverse distance by the given axle wire, the inward surfaces of the wheels being maintained apart a transverse distance greater than the transverse distance between the outward surfaces of the chassis wires, the two wheels on the given axle wire and the chassis wires define at most one contact point against transverse movement at any given instant.

The chassis additionally defines means limiting longitudinal displacement of the axle wire relative to the chassis. More particularly, in a preferred second embodiment each of the chassis wires defines a pair of substantially vertical segments, one the vertical segment to the front of the axle wire and one to the rear of the axle wire, for limiting longitudinal displacement of the axle wire forwardly or rearwardly (i.e., longitudinally) relative to the chassis wire.

Thus in the preferred embodiment each of the wheels on the given axle wire is limited against longitudinal, transverse and upward vertical displacement relative to the chassis by at most three point contacts at any given instant, and each pair of wheels on a given axle wire is limited against longitudinal, transverse and upward vertical displacement relative to the chassis by at most five point contacts at any given instant.

BRIEF DESCRIPTION OF THE DRAWING

The above and related objects of the present invention will be more fully understood by reference to the following detailed description of the presently preferred, albeit illustrative, embodiments of the present invention when taken in conjunction with the accompanying drawing wherein:

FIG. 1 is a top plan view of a toy car according to the present invention;

FIG. 2 is a side elevational view thereof, partially in cross section, taken along the line 2—2 of FIG. 1;

FIG. 3 is a sectional view thereof taken along the line 3—3 of FIG. 1;

DETAILED DESCRIPTION OF THE PREFERRED EMBODIMENTS

Figure 4:
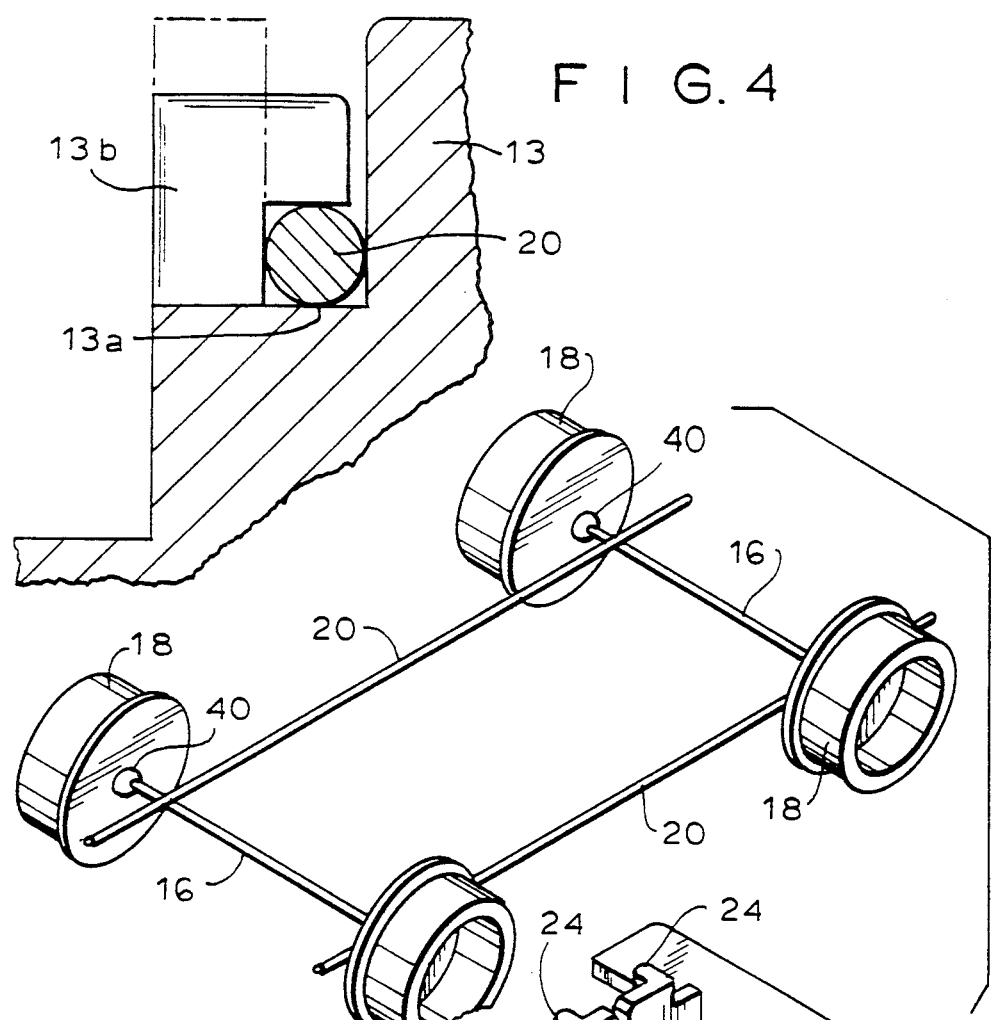
FIG. 4 is a fragmentary sectional view, to an enlarged scale, taken along the line 4—4 of FIG. 2.

Referring now to the drawing, and in particular to FIGS. 1–3 and 5 thereof, therein illustrated is a wheeled toy according to the present invention, generally designated by the reference numeral 10. In its basic conventional aspects, the car 10 is comprised of a longitudinally extending chassis generally designated 12 and at least one wheel assembly generally designated 14 mounted in the chassis. A longitudinally spaced pair of the wheeled assemblies 14 is illustrated, each wheel assembly including a cylindrical axle 16 extending transverse to the chassis 12 and a pair of transversely spaced wheels 18, preferably disposed adjacent opposite ends of the axle 16. The car 10 may additionally include a top structure (not shown) mounted on the chassis 12 so that the top structure, chassis 12 and wheel assemblies 14 generally resemble an automobile such as a racing car. As is customary in such toy cars, the chassis 12 and wheel assemblies 14 are formed of materials selected for both light weight and strength characteristics.

The chassis 12 includes a body 13 which is typically formed of a light weight, low friction plastic, at least in the portions thereof which contact the axle 16 of each wheel assembly 14, thereby to minimize friction in the areas of contact therebetween as the axles 16 support the chassis 12 against downward vertical displacement of the chassis 12 under the chassis (and top structure) weight. Typically the axle 16 of each wheel assembly extends through circular apertures or downwardly-opening U-shaped slots provided in the opposed sidewalls of the chassis body 13. This arrangement limits movement of the chassis 12 relative to the wheel assembly 14 in the longitudinal direction (the axis along which the car is traveling), the transverse or lateral direction (along the axis of the axle) and the vertical direction in the case of the circular apertures (and in the downward vertical direction in the case of the downwardly-opening U-shaped slots). Of the various friction factors involved, the most significant is the downward force exerted by the chassis on the axle under the influence of gravity Where the wheel assembly 14 is mounted to the chassis 12 by downwardly-open U-shaped slots in the sidewalls of chassis body 13, a closure for the open bottom of each slot is typically provided to preclude detachment of the wheel assembly 16 from the chassis 12 when the chassis is lifted, although this closure is typically not a source of friction when the toy car is in use and the wheel assembly must be restrained from upward vertical movement (rather than downward vertical movement) relative to the chassis.

While in a typical real car the entire wheel assembly 14 rotates relative to the chassis 12 (that is, the wheels 18 are mounted on the axle 16 for rotation therewith and the axle 16 is rotatably mounted to the chassis 12), in toy cars typically the wheels 18 are mounted on the axle 16 for free relative rotation thereto, with the axle 16 being non-rotatably mounted to the chassis 12. As the aforementioned features of a toy car 10 are well known to those skilled in the toy vehicle art, further details are not deemed necessary herein.

In its novel aspects, the car 10 includes as part of the chassis 12 cylindrical bearing wires 20 mounted adjacent opposite sidewalls of the chassis body 13 and oriented longitudinally thereof. The bearing wires 20 are substantially rigid, with a hard, smooth outer surface. While each bearing wire 20 is illustrated as traversing both of the axles 16, clearly there may be a separate bearing wire 20 for each side of each axle 16. Where there are more than two axles 16, each axle 16 may be served by a single bearing wire 20, a separate bearing wire 20, or some combination thereof. Each bearing wire 20 is secured to a respective opposed sidewall of chassis body 13 (as best seen in FIGS. 2 and 3) intermediate the axles 16, for example, by adhesive means, soldering or the like. Preferably each bearing wire 20 is secured to the sidewall of the chassis body 13 only in a center portion thereof with the opposite ends of the bearing wire 20 being free and, within the constraints of the substantial rigidity thereof, being capable of minor yet appreciable resilient vertical displacement so that each portion thereof contacting an axle 16 can serve as a shock absorber to accommodate to some degree abrupt vertical displacement of that axle 16 through a resilient flexing like a shock absorber.

In each preferred embodiment of the present invention the cylindrical axle 16 is, like the bearing wire 20, a cylindrical wire which is substantially rigid, with a hard, smooth outer surface, and thus occasionally refined to herein as an axle wire 16. Thus in each preferred embodiment the contact between each bearing wire 20 of the chassis and each axle wire 16 of a wheeled assembly 14 is a point contact 21 (see FIGS. 6 and 7) limiting downward displacement of the chassis 12 relative to the wheel assembly 14 and supporting the chassis 12 on the wheels 18. As there are four wheels 18 indicated in FIG. 1, only four point contacts 21 are required to preclude vertical downward displacement of the chassis 12 relative to wheel assemblies 14. As point contacts provide the minimum friction between two structures, the amount of friction resulting from this suspension of the chassis relative to the wheel assemblies is minimized.

In a first variation of this embodiment, the wheel assembly 14 has each wheel 18 fixedly mounted on the axle 16 for rotation of the wheel assembly 14 as a unit. Accordingly, the wire-to-wire point contact between the chassis or bearing wire 20 and the axle wire 16 is a rolling point contact when the wheel assembly 14 is rotating relative to the chassis 12. The wheels 18 may be fixed to the axle 16 for rotation therewith by suaging, keys and keyways, adhesive means, or other conventional means for securing two structures together for rotation as a unit.

In a second variation, each wheel assembly 14 has the wheels 18 thereof rotatably mounted on the axle 16 thereof, thereby to enable free rotation of the wheels 18 relative to the axle 16, and has the axle 16 rotatably mounted in the chassis 12, thereby to enable free rotation of the axle 16 relative to the chassis 12. As the car 10 in motion will follow the path of least resistance (i.e., least friction), whether the wheels 18 rotate relative to the axle 16 and the axle 16 is stationary (i.e., does not rotate) relative to the chassis 12, or whether the axle 16 rotates with the wheels 18 relative to the chassis 12, or there is some combination of both actions occurring, will be determined automatically by the car as it seeks to follow the path of least resistance. The desired rotatable mounting of a wheel 18 on an axle 16 may be obtained by simply passing an end of the axle 16 through an appropriately configured and dimensioned aperture in the center of an associated wheel 18. The portions of the axle 16 to either side of each wheel 18 may be suaged, bent, enlarged or the like to preclude the wheel 18 from passing over the extreme end of the axle 16, with resultant separation of the wheel 18 from the axle 16, and to properly position the wheels 18 on the axle 16. As the mounting of a wheel on an axle for relative rotation therebetween is well known in the toy car art, further details thereof are not deemed necessary therein.

Each of the opposed sidewalls of the chassis body 13 defines an upwardly-opening generally U-shaped slot 22 adapted to receive therein an axle 16, with the axle 16 being trapped on top by a bearing wire 20 secured to the chassis 12 and below by the bight of the slot 22. Accordingly, the wheel assembly 14 is thus mounted on the chassis 12 against vertical separation either upwardly or downwardly. The spacing of the bottom bearing wire 20 relative to the bight of the slot 22 in the vertical direction is greater than the diameter of the axle 16 so that, under the operating normal circumstance where the wheel assembly 14 is supporting the chassis 12, the axle 16 is in contact with the bearing wires 20 and not with the bight of the slots 22 of the chassis 12. Thus there is no friction between the chassis slot 22 and the wheel assembly 14 due to the weight of the chassis 12 (and top structure).

In the immediate area of the intersection of each axle 16 and a slot 22 of the chassis 12, the chassis 12 preferably defines a pair of vertically-extending ridge 24 which limits inward displacement of the abutting portion of the bearing wire 20. The ridges 24 limit the friction between each free end portion of the bearing wire 20 and the sidewall of the chassis 12 so as to facilitate resilient vertical flexing of the free end portion of the bearing wire 20 while at the same time limiting the inward deflection thereof.

Figure 5:
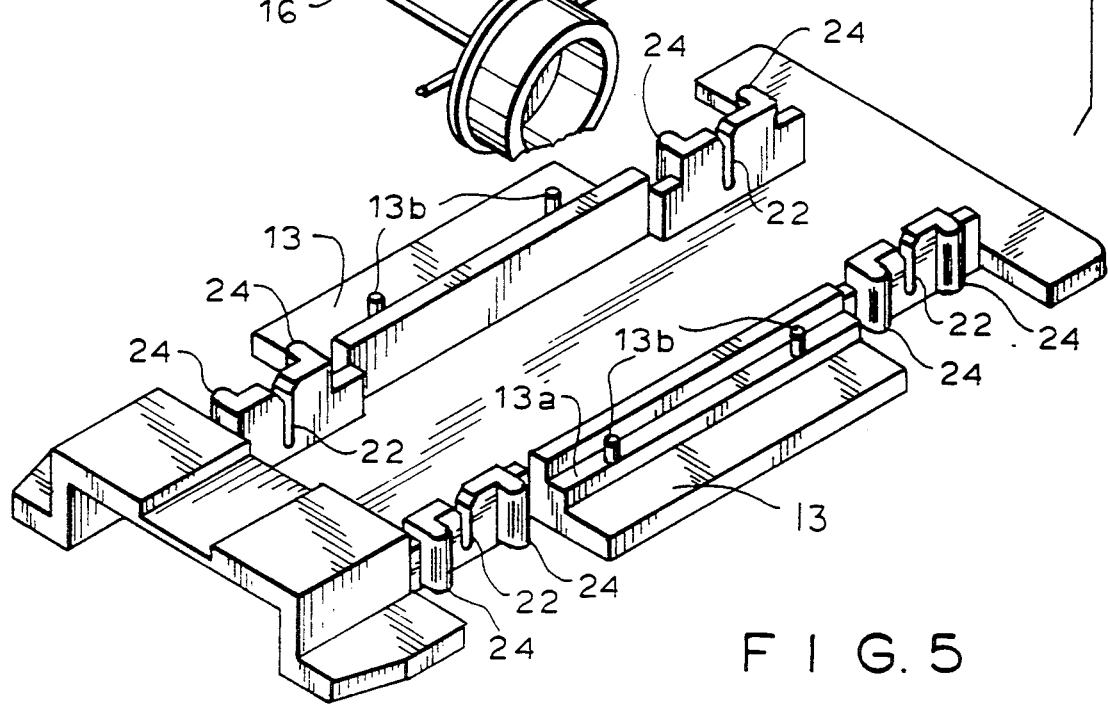
FIG. 5 is a fragmentary exploded isometric view.

Referring now to FIG. 4, therein illustrated is a preferred means of securing the bearing wire 20 to the body 13 of the chassis 12. Each sidewall of the chassis body 13 defines a shoulder or ledge 13a adapted to receive a chassis wire 20. The central portion of the chassis wire 20 intermediate its free ends is secured to the ledge 13a by bosses 13b, adhesive means (such as epoxy adhesive, hot melt adhesive, etc.) soldering, or the like effective to securely fix a metal wire to a plastic chassis body 13. The bosses 13b (preferably at least two per chassis sidewall) are originally upstanding (as illustrated in FIG. 5 and in phantom line in FIG. 4) and then bent over the chassis wires 20 (as illustrated in solid line in FIG. 4) by mechanical or thermal distortion techniques, e.g., heat staking.

Figure 6:
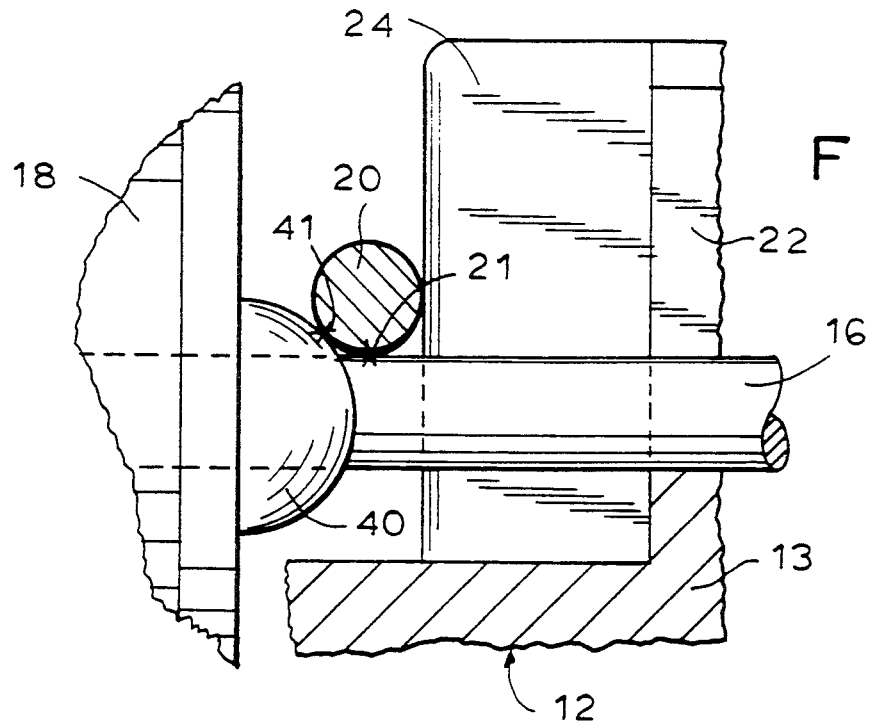
FIG. 6 is a fragmentary sectional view, to an enlarged scale, taken along the line 6—6 of FIG. 2.
Figure 7:
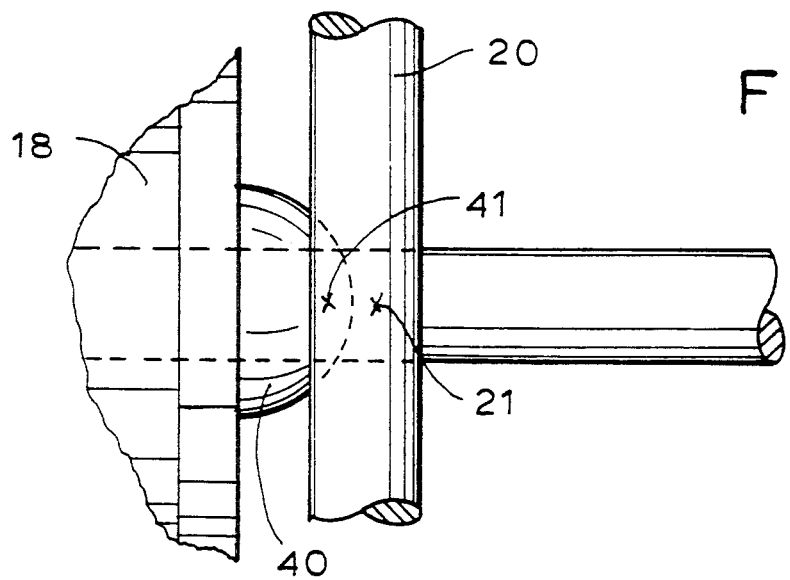
FIG. 7 is a fragmentary sectional view, to an enlarged scale, taken along the line 7—7 of FIG. 2.

Having described above the means employed by the present invention to preclude vertical separation of the chassis 12 and wheel assemblies 14, we turn now to the means employed to preclude lateral or transverse separation thereof. Referring now to FIGS. 6 and 7 as well, the inwardly facing surface of each wheel 18 defines a generally inwardly pointing hub 40 having a sloping sidewall segment configured, dimensioned and positioned to define with an adjacent chassis wire 20 at most a single point contact 41 limiting inward movement of the wheel 18 relative to the adjacent bearing wire 20, thereby to preclude direct physical contact between the wheel 18 and the chassis 12 (that is, the chassis body 13). In each wheel assembly 14 the wheels 18 on the axle 16 are maintained at a given transverse distance apart by the axle 16, the inward surfaces of the wheels 18 (that is, the innermost point of each hub 40) being maintained a transverse distance greater than the transverse distance between the outwardly facing surfaces of the bearing wires 20. Accordingly, at best, each wheel 18 will be spaced outwardly from the adjacent bearing wire 20, as illustrated in FIG. 1. At worst, the hub 40 of one wheel 18 will make a single point contact 41 with an adjacent bearing wire 20, while the hub 40 of the other wheel 18 is spaced from its adjacent bearing wire 20. Thus, for each wheel assembly 12, the means used to preclude lateral or transverse separation of the wheel assembly 14 from the chassis 12 introduces at most one additional point contact per wheel assembly 14 and possibly no additional point contacts.

Finally, the car 10 further includes means for precluding longitudinal separation of the chassis 12 and each wheeled assembly 14 so that the chassis 12 is carried along with the forward motion of the wheel assembly 14. In the first embodiment of the present invention illustrated in FIGS. 1–6, the chassis 12 defines low friction guide means for mounting the axle 16 to the chassis 12 for longitudinal movement therewith, the low friction guide means being the legs of the downwardly-opening U-shaped slots 22. One leg is disposed at the front of the axle 16, and the other leg is disposed at the rear of the axle 16, so as to limit longitudinal displacement of the axle 16 forwardly or rearwardly relative to the chassis slot 22. It will be appreciated that each axle 16 is in contact with only with the wheels 18, the bearing wires 20 and the guide means 22.

Figure 8:
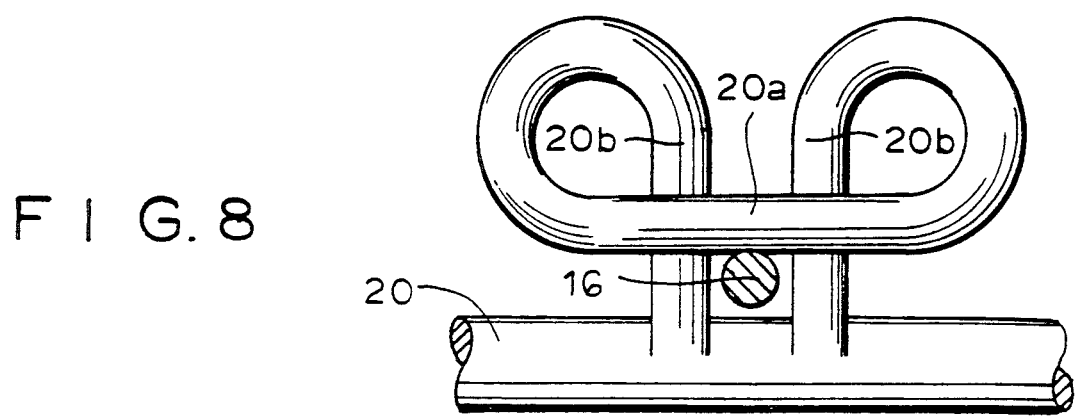
FIG. 8 is a side elevational view, to an enlarged scale, of a chassis bearing wire according to a second embodiment of the present invention.

Referring now to FIG. 8 in particular, in a second embodiment of the present invention the low friction guide means for mounting each axle 16 to the chassis 12 for longitudinal movement therewith are a pair of vertically oriented bearing wires 20b positioned to the front and rear of the axle 16 to form at most contact points therewith. Preferably the guide means — that is, the vertically oriented bearing wires 20b — are formed continuously with the bearing wire 20 of the chassis 12. As illustrated in FIG. 8, the chassis wire 20 has a portion thereof defining a first vertical segment 20b, hooking around to define a horizontal segment 20a and then hooking around again to form a second vertical segment 20b before returning to the main body of the chassis wire 20. This configuration of the bearing wire extension 20b, 20a, 20b defines with the main body of the bearing wire 20 a rectangular or box-like cage trapping the axle 16 and isolating it from the chassis body 13. The longitudinal separation between the vertical segments 20b is greater than the diameter of the axle 16, so that at most the axle 16 can make one point contact at a time with a given bearing wire vertical segment 20b. Thus, for each wheeled assembly, the longitudinal displacement of the chassis 12 and a wheeled assembly 14 is limited by at most an additional pair of point contacts (one for each chassis wire 20).

While the bearing wires 20 and the extension 20a thereof are illustrated as horizontal, and the extensions 20B thereof are illustrated as vertical, this is only an ideal configuration; cars 10 having bearing wire segments 20a, 20b which deviate from the strictly horizontal and strictly vertical, respectively, may be employed, although the point contacts produced thereby remain point contacts so long as the segments are linear in the region of contact with the axle 16 and wheel hub 40. It will be appreciated that various other configurations of the extension 20b, 20a, 20b of the bearing wire 20 may be employed for the same purposes, although the configuration of FIG. 8 is preferred.

Accordingly, it will be seen that in the second embodiment each wheeled assembly 14 is mounted to the chassis 12 in such a way that there exists at most five point contacts: two against vertical displacement (one for each wheel 18), two against longitudinal displacement (one for each wheel 18), and one against transverse or lateral displacement (at most one for each pair of wheels 18). Each individual wheel 18 is limited against longitudinal, transverse and vertical displacement by at most three point contacts at a given instant (one along each axis).

The wheels and chassis are preferably formed of high impact polystyrene although other strong, light plastics of the type conventionally employed in toy cars may be used. The chassis bearing and axle wires are preferably formed of high carbon spring steel, such as piano wire, meeting ASTM A220, A227 or A228 standards. The wires preferably have a diameter of at least 0.5 mm (0.195 inch).

To summarize, the present invention provides a wheeled toy wherein the friction between the wheel and the chassis is minimized, the wheel assembly supporting the chassis vertically exclusively by a limited number of point contacts, typically one per wheel. The wheel assembly also limits relative lateral displacement of the chassis exclusively by point contacts, typically one per wheel assembly. Finally, in one embodiment the wheel assembly limits relative vertical displacement of the chassis exclusively by point contacts, typically one per wheel, each wheel assembly therein making at most five point contacts at one time, with each individual wheel making at most three Point contacts at one time.

Now that the preferred embodiments of the present invention have been shown and described in detail, various modifications and improvements thereon will become readily apparent to those skilled in the art. Accordingly, the invention is to be construed broadly and in a manner consistent with the spirit and scope of the appended claims, and not limited by the foregoing specification.

We claim:

1. A wheeled toy comprising:
   (A) a longitudinally extending chassis including a chassis body and cylindrical bearing wires mounted adjacent opposite sides of said chassis body and oriented longitudinally thereof; and
   (B) at least on wheel assembly mounted in said chassis including a cylindrical axle generally transverse to and said chassis body, said axle contacting a downwardly limiting contact surface of said body when said wheel assembly is supported by said chassis body being vertically spaced from said contact surface of said chassis body when said chassis body is supported by said wheel assembly, thereby eliminating friction between said axle and said chassis body, and a pair of wheels mounted adjacent opposite ends of said axle;
   said bearing wires being positioned above and generally perpendicular to said axle, contacting said axle at point contacts, and transmitting the weight of said chassis through said point contacts to said wheel assemblies.

2. The toy of claim 1 additionally including ridge means for providing a lateral guide for said bearing wires with respect to said chassis body during lateral fixture of said bearing wires.

3. The toy of claim 2 wherein said ridge means extends generally orthogonally to a longitudinal axis of said chassis body.

4. The toy of claim 1 wherein said axle is a cylindrical wire, said axle and chassis wires being substantially rigid with a hard, smooth outer cylindrical surface.

5. The toy of claim 1 wherein said axle is rotatably mounted in said chassis to enable rotation of said axle relative to said chassis.

6. The toy of claim 1 wherein said chassis includes low friction guide means for mounting said axle to said chassis for movement of said axle with said chassis along the longitudinal axis of said chassis.

7. The toy of claim 6 wherein said axle is in contact only with said wheels, said chassis wires, and said guide means.

8. A wheeled toy comprising:
   (A) a longitudinally extending chassis having a transversely spaced pair of longitudinally extending cylindrical chassis wires; and
   (B) at least one wheel assembly including a transversely extending cylindrical axle wire and a transversely spaced pair of wheels mounted on said axle wire, said wheels vertically supporting said axle wire, said chassis wire, and said chassis in turn, with said axle wire supporting said chassis wire by a transversely spaced pair of wire-to-wire point contacts, a chassis-facing surface on each of said wheels being configured such that each said wheel can at most laterally abut said chassis wire with only a point contact.

9. The toy of claim 8 wherein said axle is a cylindrical wire, said axle and chassis wires being substantially rigid with a hard, smooth outer cylindrical surface.

10. The toy of claim 8 wherein in each said wheel assembly said wheels are rotatably mounted on said axle wire to enable rotation of said wheels relative to said axle wire, and said axle wire is rotatably mounted in said chassis to enable rotation of said axle wire relative to said chassis.

11. The toy of claim 8 wherein said chassis includes low friction guide means for mounting said axle to said chassis for movement of said axle with said chassis along the longitudinal axis of said chassis.

12. The toy of claim 11 wherein said axle is in contact only with said wheels, said chassis wires, and said guide means.

13. The toy of claim 11 wherein said guide means comprises a pair of vertically oriented chassis wires positioned to the front and rear of said axle to form at most point contacts therewith.

14. The toy of claim 13 wherein said chassis wires of said guide means are formed continuously with said chassis wires of said chassis.

15. The toy of claim 13 wherein said wheels are fixed on said axle for rotation of said wheel assembly as a unit guided by said chassis wires of said chassis and said guide means.

16. The toy of claim 8 having a pair of said wheel assemblies mounted on said chassis.

17. The toy of claim 8 wherein each of said chassis wires defines a substantially horizontal segment and each of said axle wires defines adjacent each end thereof a substantially horizontal segment, and each of said wire-to-wire point contacts is defined by one of said substantially horizontal chassis wire segments and one of said substantially horizontal axle wire segments.

18. The toy of claim 8 wherein in each of said wheel assemblies each of said wheels is mounted on said axle wire for rotation therewith.

19. The toy of claim 8 including a longitudinally spaced pair of said wheel assemblies.

20. The toy of claim 19 having a total of four of said wire-to-wire point contacts for supporting said chassis on said wheel assemblies against downward vertical movement.

21. The toy of claim 8 wherein said wheels on a given axle wire are fixedly spaced apart transversely further than said chassis wires supported thereby.

22. The toy of claim 21 wherein means are provided to limit outward displacement of each of said wheels relative to said given axle wire, thereby to preclude separation of said wheels from said axle wire.

23. The toy of claim 21 wherein said chassis facing surface of each of said wheels defines a generally inwardly pointing hub having a sloping sidewall segment configured, dimensioned and positioned to define with an adjacent chassis wire at most a point contact limiting inward movement of said wheel relative to said adjacent chassis wire, thereby precluding direct physical contact between said wheel and the remainder of said chassis.

24. The toy of claim 8 wherein said wheels on a given axle wire are maintained at a given transverse distance by said given axle wire, the inward surfaces of said wheels being maintained apart a transverse distance greater than the transverse distance between the outward surfaces of said chassis wires.

25. The toy of claim 24 wherein said two wheels on said given axle wire and said chassis wires define at most one point contact against transverse movement at any given instant.

26. The toy of claim 8 wherein each of said wheels is mounted on its respective axle wire for free rotation relative thereto, whereby frictional forces determine to what extent said wheels rotate with said axle wire and to what extent said wheels rotate relative to said axle wire.

27. The toy of claim 8 wherein said chassis additionally defines means limiting longitudinal displacement of said axle wire relative to said chassis.

28. The toy of claim 8 wherein said chassis wires define vertical segments for limiting longitudinal displacement of said axle wire relative to said chassis wire.

29. The toy of claim 28 wherein each of said chassis wires defines a pair of substantially vertical segments, one said vertical segment to the front of said axle wire and one to the rear of said axle wire, for limiting longitudinal displacement of said axle wire forwardly or rearwardly relative to said chassis wire.

30. The toy of claim 8 wherein each of said wheels on a given axle wire is limited against longitudinal, transverse and upward vertical displacement relative to said chassis by at most three point contacts at any given instant.

31. The toy of claim 8 wherein each pair of wheels on a given axle wire is limited against longitudinal, transverse and upward vertical displacement relative to said chassis by at most five point contacts at any given instant.

32. The toy of claim 8 wherein each of said chassis wires defines a free end at least appreciably resiliently vertically displaceable adjacent its wire-to-wire contact point with said axle wire, thereby to function as a shock absorber.

33. A wheeled toy comprising:
(A) a longitudinally extending chassis having a transversely spaced pair of longitudinally extending cylindrical chassis wires; and
(B) a longitudinally spaced pair of wheel assemblies, each of said wheel assemblies including a transversely extending cylindrical axle wire and a transversely spaced pair of wheels mounted on said axle wire;
(i) said wheels vertically supporting said axle wire, said chassis wire, and said chassis in turn, with said axle wire supporting said chassis wire against downward vertical displacement by a transversely spaced pair of wire-to-wire point contacts, each of said chassis wires defining a substantially horizontal segment, each of said axle wires defining adjacent each end thereof a substantially horizontal segment, and each of said wire-to-wire point contacts against downward vertical displacement being defined by one of said substantially horizontal chassis wire segments and one of said substantially horizontal axle wire segments, said toy having a total of four of said wire-to-wire point contacts for supporting said chassis on said wheel assemblies against downward vertical movement;
(ii) a chassis facing surface of each of said wheels defining a generally inwardly pointing hub having a sloping sidewall segment configured, dimensioned and positioned to define with an adjacent chassis wire at most a point contact limiting inward movement of said wheel relative to said adjacent chassis wire, thereby precluding direct physical contact between said wheel and the remainder of said chassis, said wheels on a given axle wire being maintained at a given transverse distance by said given axle wire, the chassis-facing surfaces of said wheels being maintained apart a transverse distance greater than the transverse distance between the outward surfaces of said chassis wires, said two wheels on said given axle wire and said chassis wires defining at most one point contact against transverse movement at any given instant;

(iii) said chassis additionally defining means limiting longitudinal displacement of said axle wire relative to said chassis.

34. The toy of claim 33 wherein each of said chassis wires defines a Pair of substantially vertical segments, one said vertical segment to the front of said axle wire and one to the rear of said axle wire, for limiting longitudinal displacement of said axle wire forwardly or rearwardly relative to said chassis wire, each of said wheels on a given axle wire being limited against longitudinal, transverse and upward vertical displacement relative to said chassis by at most three point contacts at any given instant, each pair of wheels on a given axle wire being limited against longitudinal, transverse and upward vertical displacement relative to said chassis by at most five point contacts at any given instant.

35. The toy of claim 33 wherein in each of said wheel assemblies each of said wheels is mounted on said axle wire for rotation therewith.

36. A wheeled toy comprising:
(A) a longitudinally extending chassis including bearing members disposed adjacent opposite sides of said chassis; and
(B) at least one wheel assembly mounted in said chassis including a cylindrical axle member transverse to said chassis and a pair of wheels adjacent opposite ends of said axle member;
each of said bearing members including a portion positioned above and generally perpendicular to said axle member, contacting said axle member at a point contact, and transmitting the weight of said chassis through said point contacts to said wheel assembly, a chassis-facing surface on each of said wheels being configured such that each said wheel can at most laterally abut said chassis wire with only a point contact.

37. The toy of claim 36 wherein said bearing member portion is of arcuate shape at its point contact with said axle member.

38. The toy of claim 36 wherein said bearing member portion is of convexly arcuate shape at its point contact with said axle member.

39. A wheeled toy comprising:
(A) a longitudinally extending chassis including cylindrical bearing wires mounted adjacent opposite sides of said chassis and oriented longitudinally thereof;
(B) at least one wheel assembly mounted in said chassis including a cylindrical axle transverse to said chassis and a pair of wheels adjacent opposite ends of said axle; and
(C) low friction guide means secured to said bearing wires for mounted said axle to said chassis for movement of said chassis with said axle along a longitudinal axis of said chassis, said guide means further comprising a pair of vertically oriented wires positioned to the front and rear of said axle to form at most point contacts therewith;
said chassis wires being positioned above and generally orthogonal to said axle, contacting said axle at point contacts, and transmitting the weight of said chassis through said point contacts to said wheel assemblies.

40. The toy of claim 39 wherein said axle is a cylindrical wire, said axle, chassis and guide means wires being substantially rigid with a hard, smooth outer cylindrical surface.

41. The toy of claim 39 wherein said axle is in contact only with said wheels and said chassis and guide means wires.

42. The toy of claim 39 wherein said guide means wires are formed continuously with said chassis wires.

* * * * *